United States Patent
Hattori

(10) Patent No.: US 8,150,436 B2
(45) Date of Patent: Apr. 3, 2012

(54) RADIO-WAVE PROPAGATION CHARACTERISTIC PREDICTION ASSISTING SYSTEM AND RADIO-WAVE PROPAGATION CHARACTERISTIC PREDICTION ASSISTING METHOD

(75) Inventor: Tomohide Hattori, Tokyo (JP)

(73) Assignee: NEC Corporation, Tokyo (JP)

( * ) Notice: Subject to any disclaimer, the term of this patent is extended or adjusted under 35 U.S.C. 154(b) by 405 days.

(21) Appl. No.: 12/437,630

(22) Filed: May 8, 2009

(65) Prior Publication Data

US 2009/0280799 A1 Nov. 12, 2009

(30) Foreign Application Priority Data

May 8, 2008 (JP) ................................. 2008-122133
Apr. 27, 2009 (JP) ................................. 2009-107453

(51) Int. Cl.
*H04B 7/00* (2006.01)
(52) U.S. Cl. ..... 455/514; 702/124; 702/181; 455/67.16; 455/424; 455/446
(58) Field of Classification Search .............. 455/514, 455/67.16, 67.13, 424, 423, 446, 67.11, 422.1, 455/67.14; 702/124, 181
See application file for complete search history.

(56) References Cited

U.S. PATENT DOCUMENTS

| | | | |
|---|---|---|---|
| 6,341,223 B1 * | 1/2002 | Park ............................. | 455/446 |
| 6,735,544 B2 * | 5/2004 | Furukawa et al. ......... | 455/67.16 |
| 6,876,851 B2 * | 4/2005 | Watanabe et al. ............ | 455/423 |
| 6,922,563 B2 * | 7/2005 | Furukawa et al. ............ | 455/446 |
| 6,985,839 B1 | 1/2006 | Motamedi et al. | |
| 7,079,844 B2 * | 7/2006 | Furukawa et al. ............ | 455/446 |
| 7,634,265 B2 * | 12/2009 | Sugahara et al. ............. | 455/423 |
| 7,756,523 B2 * | 7/2010 | Ebata ............................. | 455/453 |
| 7,844,264 B2 * | 11/2010 | Watanabe ..................... | 455/423 |
| 7,933,558 B2 * | 4/2011 | Sugahara et al. .......... | 455/67.11 |
| 2002/0039898 A1 * | 4/2002 | Furukawa et al. ............ | 455/423 |
| 2002/0107663 A1 * | 8/2002 | Furukawa et al. ............. | 702/181 |
| 2008/0005674 A1 | 1/2008 | Wattenberg et al. | |
| 2008/0016051 A1 | 1/2008 | Schiller | |
| 2010/0081390 A1 * | 4/2010 | Motoyoshi et al. ........ | 455/67.11 |

FOREIGN PATENT DOCUMENTS

| | | |
|---|---|---|
| EP | 1182897 A | 2/2002 |
| JP | 2002232344 A | 8/2002 |
| JP | 3495025 B | 11/2003 |

* cited by examiner

*Primary Examiner* — Lam T Mai

(57) ABSTRACT

A radio-wave propagation characteristic prediction assisting system includes a storage section, an attribute information input section, and an output section. The storage section stores attribute information of a region and reference information useful for predicting a radio-wave propagation characteristic in the region in association with each other. The attribute information input section inputs attribute information of a region whose radio-wave propagation characteristic is to be predicted. The output section searches information stored in the storage section to specify a region having an attribute which matches with the attribute information input by the attribute information input section, and outputs reference information associated with the specified region.

7 Claims, 15 Drawing Sheets

FIG. 2

RADIO WAVE STATE INFORMATION

| RADIO WAVE STATE | | | BASE STATION IDENTIFIER |
|---|---|---|---|
| RADIO INTENSITY | PROPAGATION LOSS | TRANSMISSION RATE | |
| 40dB | 100dBm | 54.3Mbps | BASE STATION A |

FIG. 3

MEASURED DATA

| MEASURED DATA | | | | |
|---|---|---|---|---|
| POSITION INFORMATION | RADIO WAVE STATE INFORMATION | | | |
| COORDINATES OF MEASURING POINT | RADIO WAVE STATE | | | BASE STATION IDENTIFIER |
| | RADIO INTENSITY | PROPAGATION LOSS | TRANSMISSION RATE | |
| X=50, Y=50 | 40dB | 100dBm | 54.3Mbps | BASE STATION A |
| X=300, Y=200 | 50dB | 120dBm | 50.1Mbps | BASE STATION B |
| ... | ... | ... | ... | ... |

FIG. 4

REGION-BY-REGION MEASURED DATA

| COORDINATES OF MEASURING POINT | REGION NAME | RADIO WAVE STATE ||| BASE STATION IDENTIFIER |
| --- | --- | --- | --- | --- | --- |
| | | RADIO INTENSITY | PROPAGATION LOSS | TRANSMISSION RATE | |
| X=50, Y=50 | D TOWN, C BOROUGH, TOKYO | 40dB | 100dBm | 54.3Mbps | BASE STATION A |
| X=300, Y=200 | G TOWN, F CITY, TOKYO | 50dB | 120dBm | 50.1Mbps | BASE STATION B |
| ... | ... | ... | ... | ... | ... |

FIG. 6A

| COORDINATE RANGE | REGION | POPULATION DENSITY | BUILDING RATIO | LAND UNDULATION |
|---|---|---|---|---|
| $0 \leqq X < 1000, 0 \leqq Y < 1000$ | D TOWN, C BOROUGH, TOKYO | MIDDLE | – | – |
| ... | ... | ... | ... | ... |
| ... | ... | ... | ... | ... |
| $1000 \leqq X < 2000, 0 \leqq Y < 1000$ | G TOWN, F CITY, TOKYO | LOW | MIDDLE | LOW |
| ... | ... | ... | ... | ... |

ROW R1

FIG. 6B

| SUB REGION | COORDINATE RANGE | BUILDING | MOUNTAINOUS REGION |
|---|---|---|---|
| G TOWN 1, F CITY, TOKYO | $1000 \leqq X < 1166, 0 \leqq Y < 166$ | BUILDING | YES |
| G TOWN 2, F CITY, TOKYO | $1000 \leqq X < 1333, 0 \leqq Y < 166$ | BUILDING | YES |
| G TOWN 2, F CITY, TOKYO | $1000 \leqq X < 1498, 0 \leqq Y < 166$ | NO | YES |
| G TOWN 3, F CITY, TOKYO | $1000 \leqq X < 1664, 0 \leqq Y < 166$ | NO | NO |
| ... | ... | ... | ... |
| G TOWN 7, F CITY, TOKYO | $1833 \leqq X < 2000, 833 \leqq Y < 1000$ | BUILDING | NO |

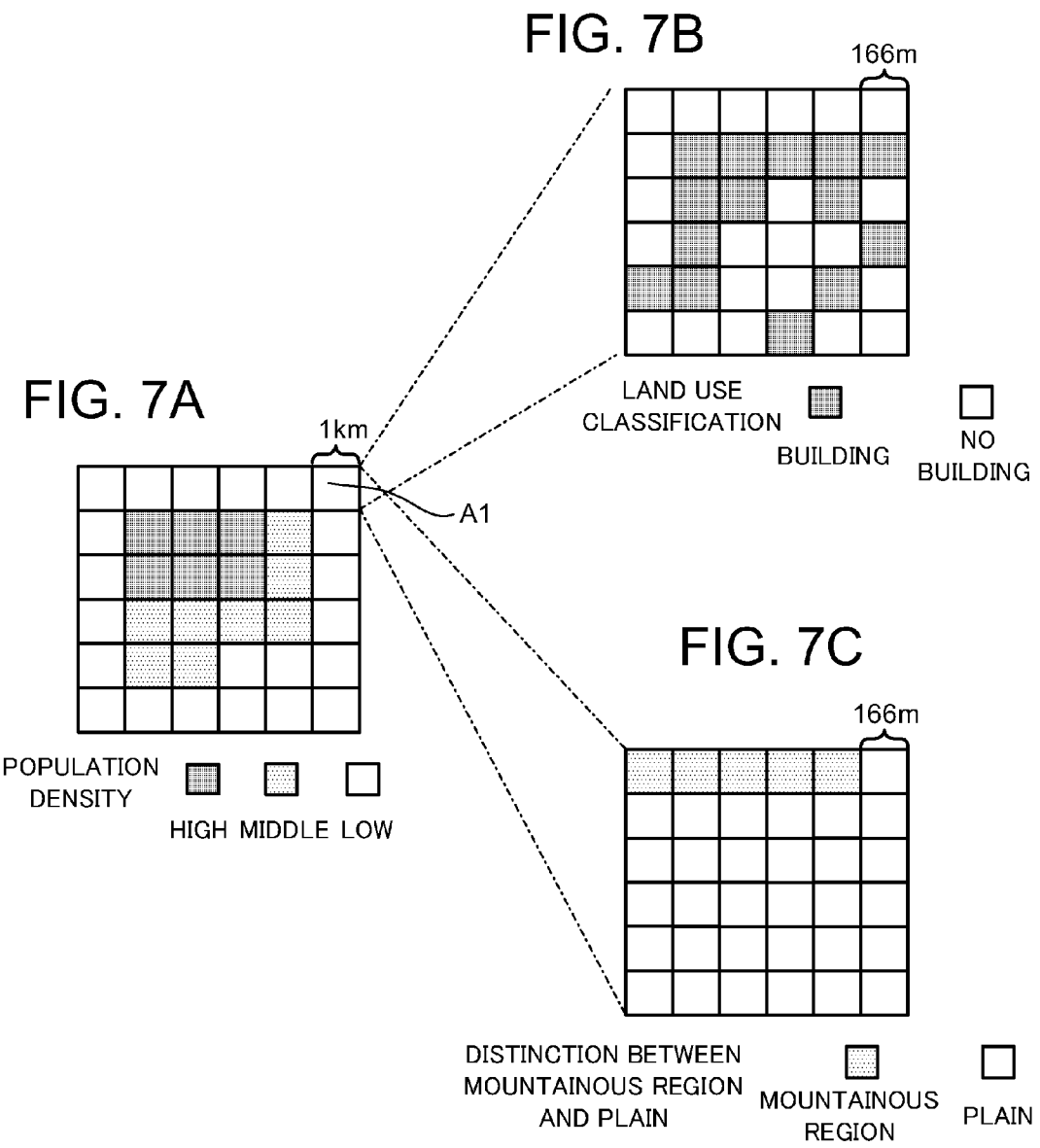

| REGION (COORDINATE RANGE) | RADIO-WAVE PROPAGATION CHARACTERISTIC INFORMATION |
|---|---|
| 0≦X＜1000、0≦Y＜1000 | L=54+40log(d)-30log(hb)+21log(fc)+$\alpha$+18 |
| ... | ... |
| ... | ... |
| 1000≦X＜2000、0≦Y＜1000 | L=54+40log(d)-30log(hb)+21log(fc)+$\alpha$+30 |
| ... | ... |

ROW R2

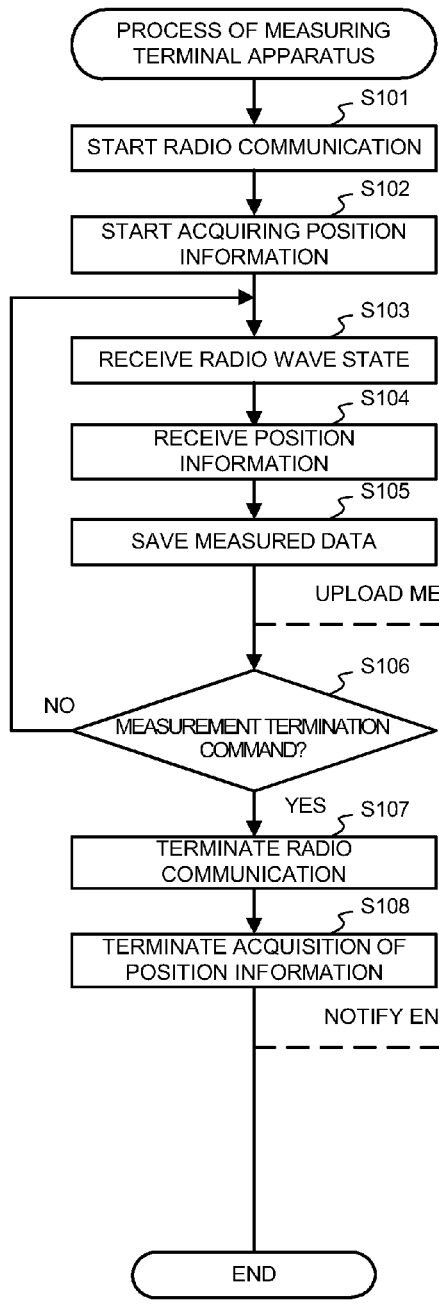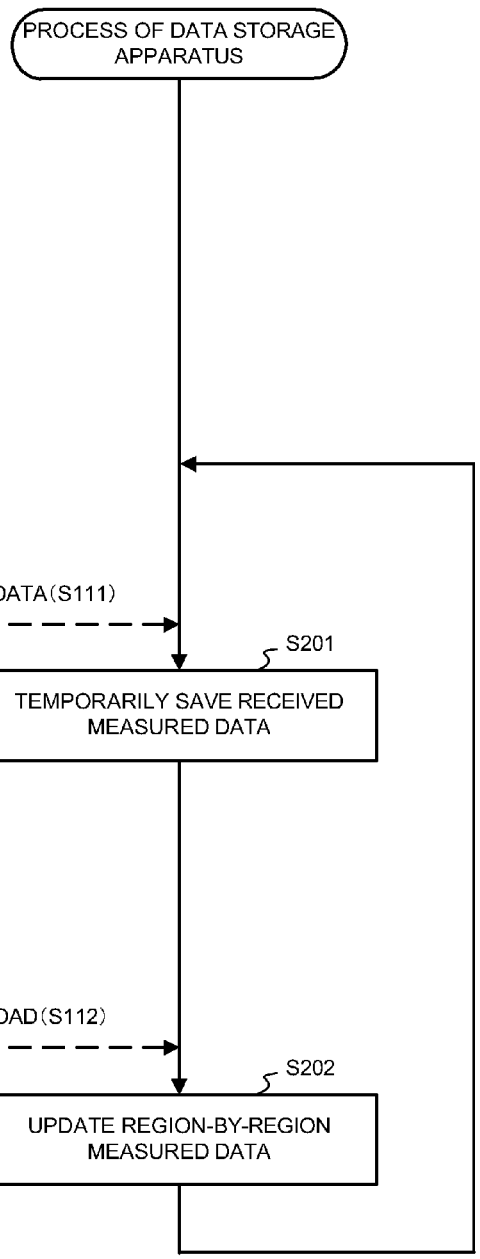
FIG. 10A
FIG. 10B

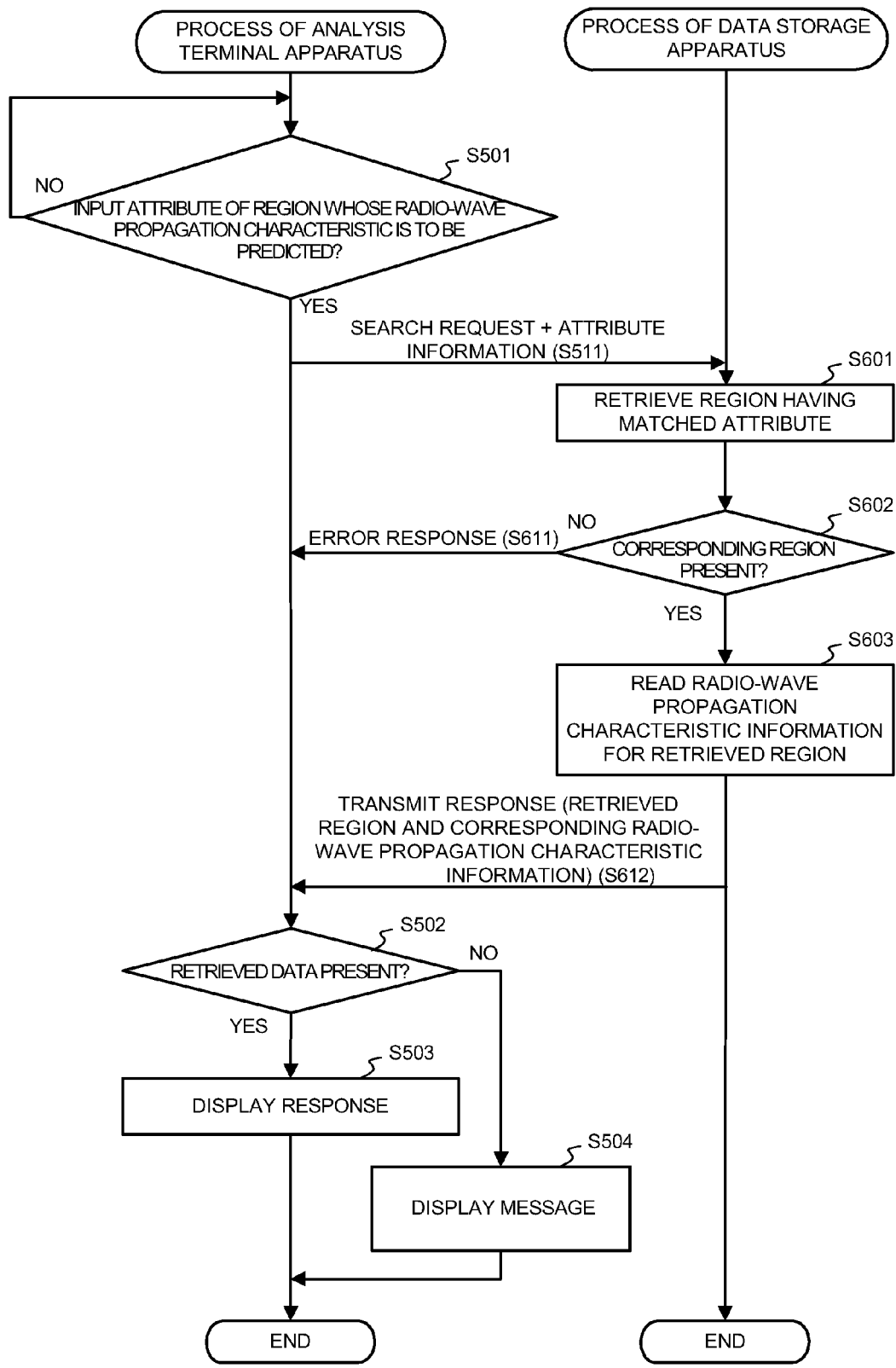

FIG. 14A

| COINCIDENCE | LATITUDE/LONGITUDE | REGION NAME | RADIO-WAVE PROPAGATION CHARACTERISTIC INFORMATION | |
|---|---|---|---|---|
| 100% | 0≦X<1000, 0≦Y<1000 | D TOWN, C BOROUGH, TOKYO | L=54+40log(d)-30log(hb)+21log(fc)+α+18 | DETAILS |
| 90% | 1000≦X<2000, 0≦Y<1000 | G TOWN, F CITY, TOKYO | L=54+40log(d)-30log(hb)+21log(fc)+α+30 | DETAILS |
| ... | ... | ... | ... | |

FIG. 14B

| LATITUDE/LONGITUDE | 0≦X＜1000、0≦Y＜1000 | |
|---|---|---|
| REGION NAME | D TOWN, C BOROUGH, TOKYO | MAP |
| POPULATION DENSITY | MIDDLE | 500/km2 |
| BUILDING RATIO | LOW | 500/km2 |
| LAND UNDULATION | MIDDLE | 500/km2 |
| RADIO-WAVE PROPAGATION CHARACTERISTIC INFORMATION | $L=54+40\log(d)-30\log(hb)+21\log(fc)+\alpha+18$ | |
| SERVICE PROVIDING INFORMATION | | |
| LINK | | |

FIG. 16

UPLOAD MEASURED DATA?

YES  NO

RADIO-WAVE PROPAGATION CHARACTERISTIC PREDICTION ASSISTING SYSTEM AND RADIO-WAVE PROPAGATION CHARACTERISTIC PREDICTION ASSISTING METHOD

INCORPORATION BY REFERENCE

This application is based on Japanese Patent Application No. 2008-122133 filed on May 8, 2008, Japanese Patent Application No. 2009-107453 filed on Apr. 27, 2009 and including specification, claims, drawings and summary. The disclosures of the above Japanese Patent Applications are incorporated herein by reference in its entirety.

TECHNICAL FIELD

The present invention relates to a technique of assisting a process of predicting the radio-wave propagation characteristic of an arbitrary region.

BACKGROUND ART

Various techniques are proposed which measure the radio wave state of radio communication, and collects the measuring results.

For example, Unexamined Japanese Patent Application KOKAI Publication No. 2002-232344 discloses a system which grasps a radio wave state (intensity of a received radio wave) in a communication region. This system includes radio wave state information collecting apparatuses each mounted in a vehicle or the like, and a management center which can radio-communicate with the radio wave state information collecting apparatuses. Each radio wave state information collecting apparatus generates reception intensity information representing the reception intensity of a radio wave transmitted from a radio base station (reception field intensity). Each radio wave state information collecting apparatus generates radio wave state information which includes the generated reception intensity information, point information representing the point of reception, and time information representing a current time, and transmits those information to the management center. The management center determines an area where the reception intensity represented by the reception intensity information based on the point information, and controls such that the distribution of reception intensities is displayed on a map so that a user can visually grasp the reception intensity.

Japanese Patent No. 3495025 discloses a system which collects data representing a reception intensity from a portable terminal. This system includes a plurality of portable terminals, a mobile communication network, and a radio wave measuring system. When a portable terminal within a survey target area transmits, an exchange for the mobile communication network collects reception level data and position data from the portable terminal, adds time information or the like, and transmits the resultant data to the radio wave measuring system. The radio wave measuring system analyzes the received information, and grasps the radio wave state of the target area in real time.

When a mobile communication undertaker or the like carries out a new mobile communication service in a region, the radio-wave propagation characteristic, such as the propagation loss, in that region needs to be predicted. At this time, reference may be made to data on other regions which has been measured using the above-described techniques or so.

The forgoing publications merely disclose the techniques of collecting data representing the radio wave state of a region which a communication business is actually carried out, and do not disclose a technique of predicting the radio-wave propagation characteristic of another arbitrary region using the collected data.

SUMMARY

In light of the foregoing circumstance, it is an exemplary object of the present invention to provide a radio-wave propagation characteristic prediction assisting system and a radio-wave propagation characteristic prediction assisting method which assist a work of predicting the radio-wave propagation characteristic of an arbitrary region based on measured data on another region.

To achieve the object, a radio-wave propagation characteristic prediction assisting system according to a first exemplary aspect the invention includes:

a storage section that stores attribute information of a region and reference information useful for predicting a radio-wave propagation characteristic in the region in association with each other;

an attribute information input section that inputs attribute information of a region whose radio-wave propagation characteristic is to be predicted; and an output section that searches information stored in the storage section to specify a region having an attribute which matches with the attribute information input by the attribute information input section, and outputs reference information associated with the specified region.

A radio-wave propagation characteristic prediction assisting method according to a second exemplary aspect the invention includes:

a storage step of storing attribute information of a region and reference information useful for predicting a radio-wave propagation characteristic in the region in association with each other;

an attribute information input step of inputting attribute information of a region whose radio-wave propagation characteristic is to be predicted; and an output step of searching information stored in the storage step to specify a region having an attribute which matches with the attribute information input in the attribute information input step, and outputting reference information associated with the specified region.

A radio-wave propagation characteristic prediction assisting device according to a third exemplary aspect the invention includes:

storage means that stores attribute information of a region and reference information useful for predicting a radio-wave propagation characteristic in the region in association with each other;

attribute information input means that inputs attribute information of a region whose radio-wave propagation characteristic is to be predicted; and output means that searches information stored in the storage means to specify a region having an attribute which matches with the attribute information input by the attribute information input means, and outputs reference information associated with the specified region.

According to the invention, as region information on a region whose radio wave state is not measured is designated, the radio-wave propagation characteristic of that region can be predicted.

BRIEF DESCRIPTION OF THE DRAWINGS

FIG. 2 is a diagram showing the structure of radio wave state data which is generated by a measuring terminal apparatus;

FIG. 3 is a diagram showing the structure of measured data which is generated by a measuring terminal apparatus;

FIG. 4 is a diagram showing the structure of region-by-region measured data which is saved in a measured data storage section;

FIG. 6A is a diagram showing the structure of region characteristic information which is saved in the region information storage section;

FIG. 6B is a diagram showing the structure of region characteristic information of a sub region which is saved in the region information storage section;

FIGS. 7A to 7C are diagrams for explaining how to add region characteristic information to a region;

FIGS. 10A and 10B are flowcharts illustrating procedures from the initiation of measuring a radio wave state with the measuring terminal apparatus to a process of saving region-by-region measured data in a data storage apparatus;

FIGS. 13A and 13B are flowcharts illustrating procedures of a process in which an analysis terminal apparatus searches radio-wave propagation characteristic information in the data storage apparatus;

FIGS. 14A and 14B are diagrams showing examples of response information to be displayed on the analysis terminal apparatus;

FIG. 16 is a diagram showing an example of an upload inquiry screen.

EXEMPLARY EMBODIMENTS

First Embodiment

A radio-wave propagation characteristic prediction assisting system 1 according to a first embodiment of the present invention is described below with reference to the accompanying drawings.

The radio-wave propagation characteristic prediction assisting system 1 according to the first embodiment i) actually measures the radio wave state of each region where a mobile communication service has already been provided, and stores the radio wave state, and ii), when starting a new mobile communication service in a region, extracts the radio-wave propagation characteristic of a service-provided region having the same attribute as the attribute of that region from stored information, and presents the information. Accordingly, the radio-wave propagation characteristic prediction assisting system 1 assists a user in a process of predicting the radio-wave propagation characteristic or the like of an arbitrary region.

Figure 1:
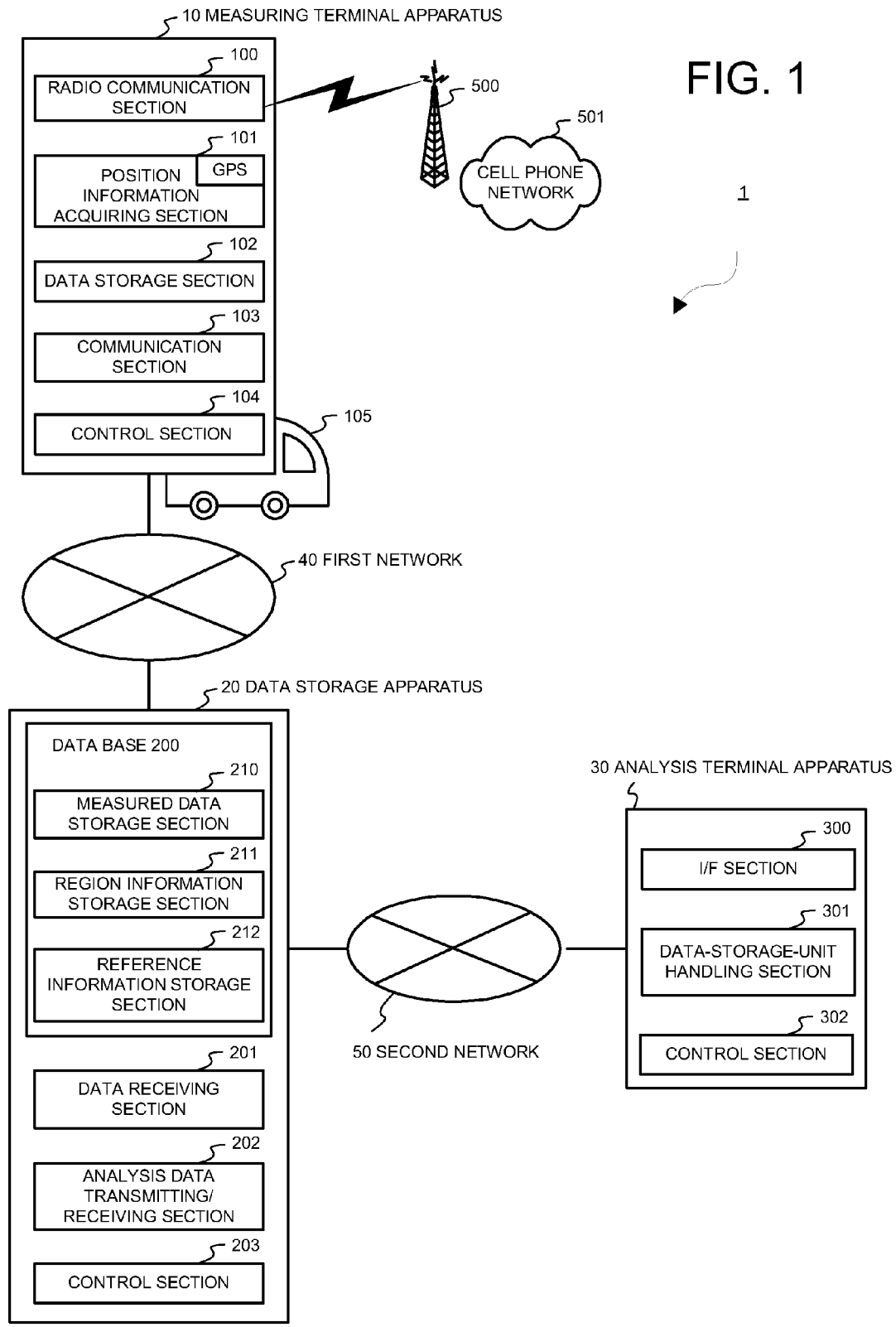
FIG. 1 is a diagram showing the general configuration of a radio-wave propagation characteristic prediction assisting system according to a first embodiment of the present invention.

As shown in FIG. 1, the radio-wave propagation characteristic prediction assisting system 1 includes a measuring terminal apparatus 10, a data storage apparatus 20, and an analysis terminal apparatus 30. The measuring terminal apparatus 10 and the data storage apparatus 20 are connected to a first network 40, such as the Internet, to be communicatable with each other. The data storage apparatus 20 and the analysis terminal apparatus 30 are connected to a second network 50, such as the Internet, to be communicatable with each other. It is possible to take a configuration where the measuring terminal apparatus 10, the data storage apparatus 20 and the analysis terminal apparatus 30 are connected to a common network.

The measuring terminal apparatus 10 actually measures a radio wave state (signal intensity, radio quality, transmission rate) of a region where a mobile communication service has already been provided, and stores data on the radio wave state. The measuring terminal apparatus 10 is mounted on a vehicle (e.g., an automobile or an electric train or the like) 105, measures radio wave states at individual points in the mobile range of the vehicle 105, generates measured data representing the measured radio wave state, and transmits the measured data to the data storage apparatus 20.

The measuring terminal apparatus 10 functionally includes a radio communication section 100, a position information acquiring section 101, a data storage section 102, a communication section 103, and a control section 104.

The radio communication section 100 (radio wave state measuring section) has a PC card (also called PCMCIA card) or the like, and has a function of communicating a cell phone network 501 via a base station 500. For example, W-CDMA, CDMA 2000, HSPA (High Speed Packet Access), WiMAX (Worldwide Interoperability for Microwave Access) or the like may be adopted as the communication system to be used in radio communication.

The radio communication section 100 further has a function of measuring a radio wave state in communication mode. The "radio wave state" herein means the signal intensity of a received radio wave (Received Signal Strength Indicator), the radio quality which is determined from the propagation loss, and the transmission rate such as the packet transmission/reception speed. The radio communication section 100 adds the identifier of the base station 500 serving as the communication counterpart to the measured radio wave state to generate radio wave state information shown in FIG. 2, and outputs the radio wave state information.

The position information acquiring section 101 has a GPS (Global Positioning System) receiver, measures the current position (latitude, longitude) of the measuring terminal apparatus 10 from the GPS radio wave received by the GPS receiver, and outputs position information. The position information acquiring section 101 has an autonomous navigation function. Specifically, the position information acquiring section 101 has a vehicle speed pulse sensor, a gyroscope, etc., acquires the current position based on signals detected thereby when a GPS radio wave is not obtained, or corrects the current position measured based on the GPS radio wave.

The data storage section 102 has a storage device, such as a hard disk or a flash memory, and stores measured data including radio wave state information output from the radio communication section 100 and position information output from the position information acquiring section 101, as shown in FIG. 3.

The communication section 103 transmits and receives data to and from the data storage apparatus 20 via the first network 40 in a predetermined communication system.

The control section 104 includes a CPU (Central Processing Unit), a RAM (Random Access Memory), and a ROM (Read Only Memory), and performs the general control of the measuring terminal apparatus 10 according to a software program stored in the ROM or the like. For example, the control section 104 executes a process illustrated in a flowchart shown in FIG. 10A to combine, for example, radio wave state information shown in FIG. 2 output from the radio communication section 100 and position information output from the position information acquiring section 101 to generate measured data shown in FIG. 3, and stores the measured data in the data storage section 102.

The data storage apparatus 20 i) processes the measured data measured and collected by the measuring terminal apparatus 10 to acquire the radio-wave propagation characteristic for each region where a mobile communication service has already been provided and stores the radio-wave propagation characteristic, and ii) receives the attribute of an arbitrary region (normally, arbitrary region in an area where a mobile communication service is newly started) from the analysis terminal apparatus 30, extracts information on a region which has the same attribute as the received attribute from the stored information, and transmits the extracted information to the analysis terminal apparatus 30.

The data storage apparatus 20 includes an information processing unit, such as a workstation unit, a server unit, or the like, and functionally includes a database 200, a data receiving section 201, an analysis data transmitting/receiving section 202 and a control section 203.

The database 200 includes a storage device, such as a hard disk, and functionally includes a measured data storage section 210, a region information storage section 211 and a reference information storage section 212.

The measured data storage section 210 stores region-by-region measured data. As shown in FIG. 4, the region-by-region measured data is data that the region name of the point where the data is acquired is added to the measured data shown in FIG. 3. The region-by-region measured data is generated by the control section 203.

Figure 5:
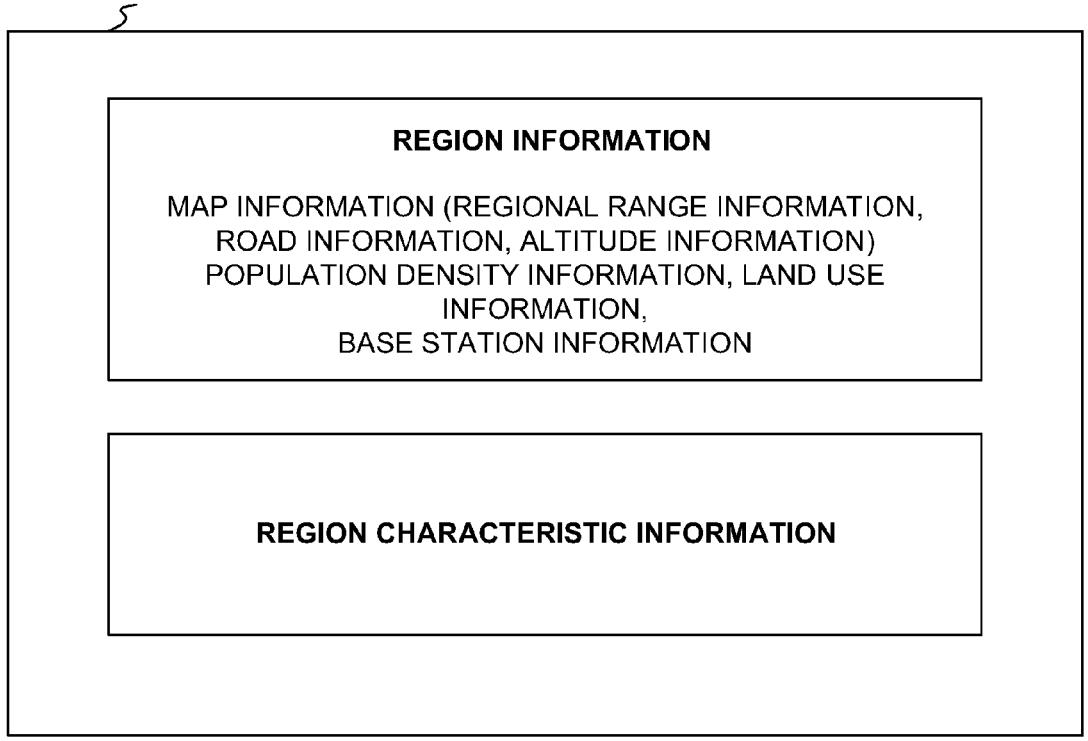
FIG. 5 is a diagram showing information which is saved in the region information storage section.

As shown in FIG. 5, the region information storage section 211 stores region information and region characteristic information. The region information includes map information (topographical map, altitude information, etc.) provided generally, and population density information and land use information for each administrative district (e.g., state, county, city) which are issued from a public office or the like, and information on base stations and radio towers sited in each region.

The region characteristic information is created beforehand based on region information by the control section 203. The details of the region characteristic information are given below referring to FIG. 6A to FIG. 7C.

As shown in FIG. 6A, the region characteristic information includes information on each preset region, such as the coordinate range, the name of the region, population density, building ratio and undulation of lands. The region characteristic information is generated as follows using region information or the like. First, as shown in FIG. 7A, square blocks each having a side of 1 km are set on a map, each block being a single region. Next, the range of the coordinates (latitude Y and longitude X) is acquired. Next, the name of the region (region name) is acquired by referring to the region information. If there are areas with multiple region names in the region (block), the region name of the area with the largest area, for example, is set. Then, the population density in that block is acquired by using the region information or the like, and the region is labeled in such a way that, for example, a region with a population density of 10000 persons/km$^2$ or greater is labeled "high", a region with a population density of 5000 persons/km$^2$ or greater and less than 10000 persons/km$^2$ is labeled "middle", and a region with a population density of less than 5000 persons/km$^2$ is labeled "low".

Further, each region labeled "low population density" like row RI in FIG. 6A is divided into six sections vertically and horizontally as shown in FIGS. 7B and 7C (a total of 36 sections, which are hereinafter called sub regions), and the coordinate ranges and the region names thereof are set as shown in FIG. 6B. Next, based on the land use information published as statistical information, each sub region is classified into either "building" which is a region where a building is constructed or a "no building" which is a region where a building is not constructed, as shown in FIG. 7B. As shown in FIG. 7C, based on the map information and land use information, it is determined whether or not each sub region is equivalent to a "mountainous region". Data on sub regions labeled in the above manner are generated as shown in FIG. 6B.

A table shown in FIG. 6B is used to perform labeling of regions. A region with a "low" population density is constituted by sub regions. When, of the sub regions, the ratio of those which are "building" in the classification is 70% or higher, a label of "high" building ratio is given to the concerned region. If the ratio is equal to or greater than 30% and less than 70%, a label of "middle" building ratio is given to the region, and when less than 30%, a label of "low" building ratio is given to the region. Thus given label is set in the table in FIG. 6A. Likewise, of the sub regions, the ratio of those which are "mountainou region" in the classification is 70% or higher, a label of "high" undulation is given to the region, and if the ratio is equal to or greater than 30% and less than 70%, a label of "middle" undulation is given to the region. When the ratio is less than 30%, a label of "low" undulation is given to the region. Thus given label is set in the table in FIG. 6A.

In the example shown in FIGS. 7A to 7C, given that sub regions constituting a region A1 with a "low" population density in FIG. 7A has a land use as shown in FIG. 7B, the ratio of those sub regions which are classified into "building" is 14/36 which is 30% or greater and less than 70%. Therefore, the region A1 is labeled as the "middle" building ratio. If sub regions constituting the region A1 have a state equivalent to "mountainous region" as shown in FIG. 7C, the ratio of those sub regions which are classified into "mountainous region" is 5/36 which is less than 30%. Therefore, the region A1 is labeled as the "low" undulation.

After all, the region A1 in FIG. 7A is labeled as "low population density/middle building ratio/low undulation". The region characteristic data generated by the control section 203 in the above manner is stored in the region information storage section 211.

Figures 8, 9:
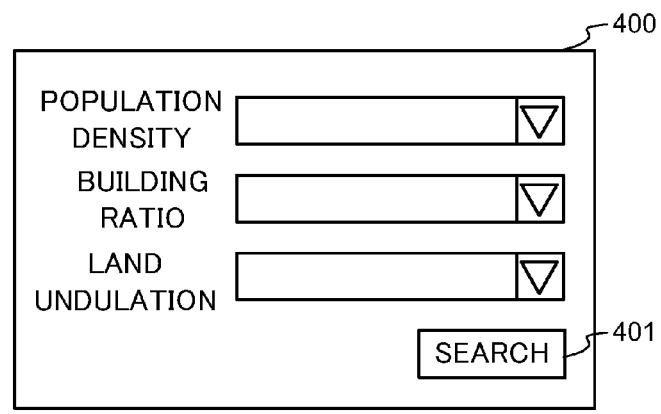
FIG. 8 is a diagram showing an example of radio-wave propagation characteristic information which is stored in a reference information storage section.
FIG. 9 is a diagram showing an example of an inquiry screen for radio-wave propagation characteristic information.

For each region (block), the reference information storage section 212 shown in FIG. 1 stores information to be referred to at the time of predicting the radio-wave propagation characteristic in a region similar to that region, as shown in FIG. 8. Specifically, the reference information storage section 212 stores radio-wave propagation characteristic information for predicting the radio-wave propagation characteristic in that area as reference information. As a specific example, the reference information storage section 212 stores a calculation formula representing the propagation loss (propagation loss calculation formula). The propagation loss calculation formula is created for each region (block in FIG. 7A) using region-by-region measured data stored in the measured data storage section 210 and region information (base station information) stored in the region information storage section 211 or the like.

The data receiving section 201 shown in FIG. 1 transmits and receives data to and from the measuring terminal apparatus 10 via the first network 40 in a predetermined communication system.

The analysis data transmitting/receiving section 202 transmits and receives data to and from the analysis terminal apparatus 30 via the second network 50 in a predetermined communication system.

The control section 203 includes a CPU, a RAM, and a ROM, and performs the general control of the data storage apparatus 20 according to a software program stored in the ROM or the like. For example, the control section 203 puts "region name" labels to measured data shown in FIG. 3 transmitted from the measuring terminal apparatus 10 by referring to the region characteristic information stored in the region information storage section 211 to generate region-by-region measured data as shown in FIG. 4. The control section 203 stores the generated region-by-region measured data in the measured data storage section 210.

The control section 203 generates, for each region, radio-wave propagation characteristic information in that region using the region-by-region measured data stored in the measured data storage section 210, and stores the radio-wave propagation characteristic information in the reference information storage section 212 region by region. The process of acquiring the radio-wave propagation characteristic information is described later.

The analysis terminal apparatus 30 shown in FIG. 1 is operated mainly by a person who is doing a work to initiate a mobile communication service. When there is a region whose radio-wave propagation characteristic is desired to be predicted (region of interest), the user inputs the attribute of that region into the analysis terminal apparatus 30. The analysis terminal apparatus 30 transmits the input attribute to the data storage apparatus 20. The data storage apparatus 20 searches for a region which has an attribute substantially matching with the input attribute, and notifies the analysis terminal apparatus 30 of the region and the radio-wave propagation characteristic information thereof. The analysis terminal apparatus 30 displays the notified radio-wave propagation characteristic information and the like. The user predicts the radio-wave propagation characteristic of the region of interest while referring to the radio wave state in a region which has a similar region characteristic to that of the region of interest and where the service is also provided.

The analysis terminal apparatus 30, which is realized by an information processing unit, such as a personal computer, includes an interface (I/F) section 300, a data-storage-apparatus handling section 301 and a control section 302.

The I/F section 300 has a display unit like a monitor to display various kinds of data and images. For example, the I/F section 300 displays a condition inquiry screen as shown in FIG. 9 on the monitor or the like. When the user inputs the attribute of the region whose radio-wave propagation characteristic is to be predicted as a search condition, the I/F section 300 accepts the input condition. When there is data on the region that is equivalent to the input condition, the I/F section 300 displays the data.

The data-storage-apparatus handling section 301 transmits and receives data to and from the data storage apparatus 20 via the second network 50 in a predetermined communication system. Specifically, when the user inputs the condition (attribute) of the region whose radio-wave propagation characteristic is to be predicted, the data-storage-apparatus handling section 301 transmits the search request and the input attribute to the data storage apparatus 20, and receives a response (the retrieved region and the attribute and radio-wave propagation characteristic information thereof) transmitted from the data storage apparatus 20.

The control section 302 includes a CPU, a RAM, and a ROM, and performs the general control of the analysis terminal apparatus 30 according to a software program stored in the ROM or the like. The control section 302 performs, for example, a process illustrated in a flowchart in FIG. 13A.

A description is now given of a process of measuring a radio wave state to acquire measured data at each point in an area where a communication service has already been provided, by using the radio-wave propagation characteristic prediction assisting system 1 having the foregoing configuration. The process is executed mainly by the measuring terminal apparatus 10.

When the user of the measuring terminal apparatus 10 activates a measuring program (stored in the ROM or the like in the control section 104), the measuring terminal apparatus 10 (control section 104) starts the process illustrated in FIG. 10A. First, the control section 104 causes the radio communication section 100 to initiate radio communication (step S101). The control section 104 causes the position information acquiring section 101 to start acquiring position information (step S102). Then, the control section 104 receives the radio wave state (radio intensity, propagation loss, transmission rate) shown in FIG. 2 which are measured by the radio communication section 100 (step S103), and receives position information measured by the position information acquiring section 101 (step S104).

The control section 104 joins the received radio wave state and position information to generate measured data shown in FIG. 3, and saves the measured data in the data storage section 102 (step S105).

Subsequently, the control section 104 determines whether or not the user has input a command to terminate measurement (step S106). When there is no termination command (step S106; NO), the control section 104 repeats the process starting at step S103. When there is the termination command from the user (step S106; YES), the control section 104 terminates radio communication of the radio communication section 100 (step S107), and terminates acquisition of the current position of the position information acquiring section 101 (step S108), thereby terminating the current sequence of processes.

The control section 104 transmits (uploads) the measured data saved in the data storage section 102 to the data storage apparatus 20 via the communication section 103, for example, every given period or every time a given amount of data is stored (step S111).

After it is determined that there has been the measurement termination command (step S106; YES), when uploading of the measured data stored in the data storage section 102 is completed, the control section 104 notifies the data storage apparatus 20 of the end of uploading (step S112).

The data storage apparatus 20 in an activating mode repeatedly executes a process illustrated in FIG. 10B, and is standing by for reception of measured data from the measuring terminal apparatus 10.

When receiving measured data from the measuring terminal apparatus 10, via the data receiving section 201 the control section 203 of the data storage apparatus 20 temporarily saves the measured data in the internal memory (step S201).

Thereafter, the control section 203 sequentially receives uploaded measured data until it receives notification of the end of uploading from the measuring terminal apparatus 10

Upon reception of the notification of the end of uploading from the measuring terminal apparatus 10, the control section 203 labels each piece of measured data stored in the internal memory with the region name of the measuring point to create region-by-region measured data shown in FIG. 4, and adds the region-by-region measured data to the region-by-region measured data that is already stored in the measured data storage section 210 (step S202). This process is described referring to FIG. 11.

First, the control section 203 specifies one of pieces of measured data currently received as a process target (step S301). Next, the control section 203 extracts the coordinates of a measuring point included in the measured data specified as the process target (step S302). Then, with the coordinates of the extracted measuring point being a key, the control section 203 searches region characteristic information shown in FIGS. 6A and 6B to specify the region name of the measuring point (step S303). The control section 203 adds the specified region name to the measured data to generate region-by-region measured data (step S304).

The control section 203 temporarily stores the generated region-by-region measured data in the internal memory (step S305).

Then, the control section 203 determines whether or not processing of every measured data currently received is finished (step S306). When the processing is not finished, i.e., when unprocessed measured data remains (step S306; NO), the control section 203 specifies next process-target measured data in step S301, and executes a similar sequence of processes thereafter.

Finally, when the processing of every measured data measured data received is finished (step S306; YES), the control section 203 additionally saves the generated region-by-region measured data in the measured data storage section 210 (step S307). Subsequently, with the coordinates of the measuring point being a key, the control section 203 sorts the updated region-by-region measured data to be grouped region by region (block) (step S308), and then terminates the process.

Figure 11:
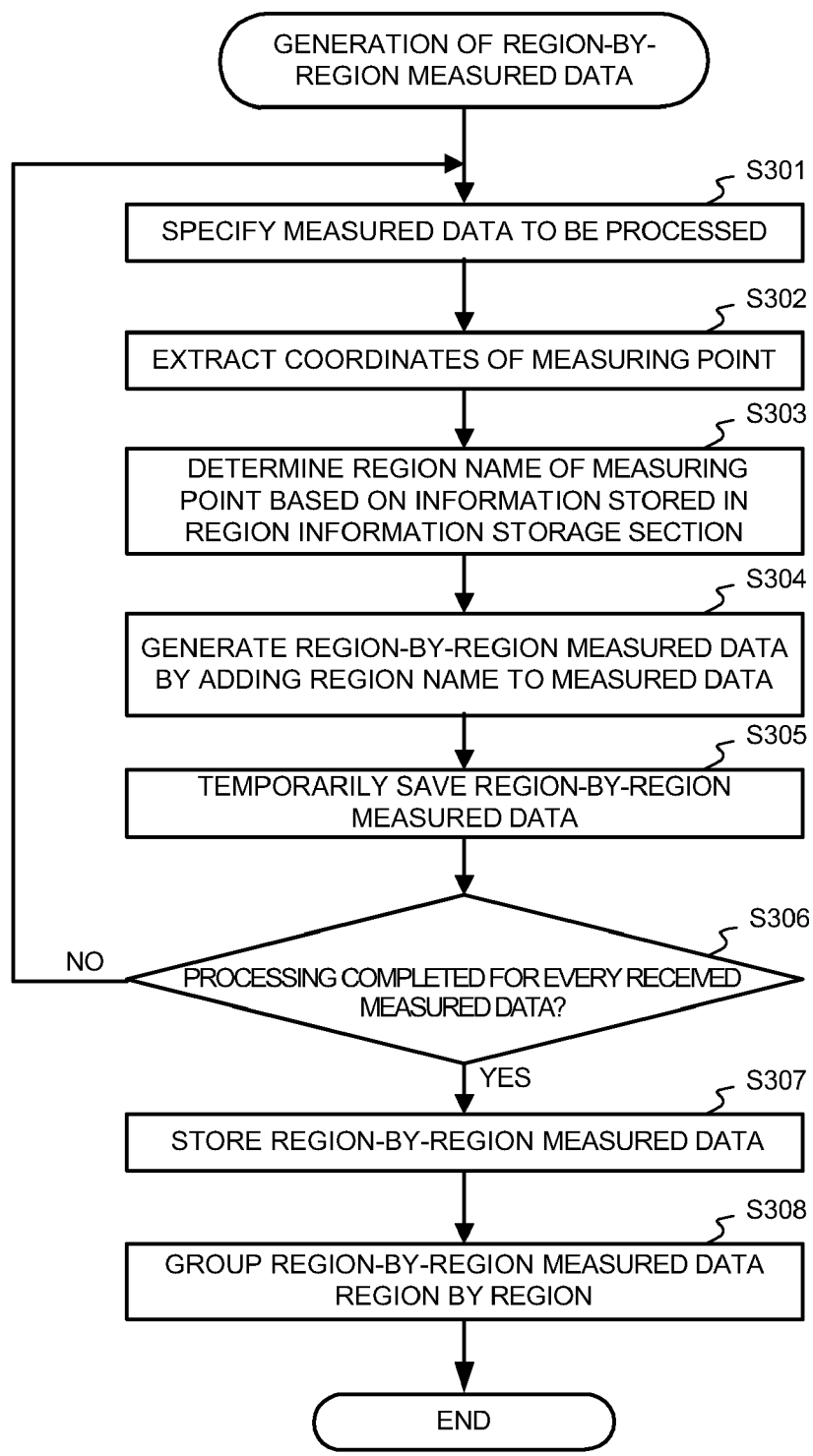
FIG. 11 is a flowchart illustrating procedures of a process of generating region-by-region measured data.
Figure 12:
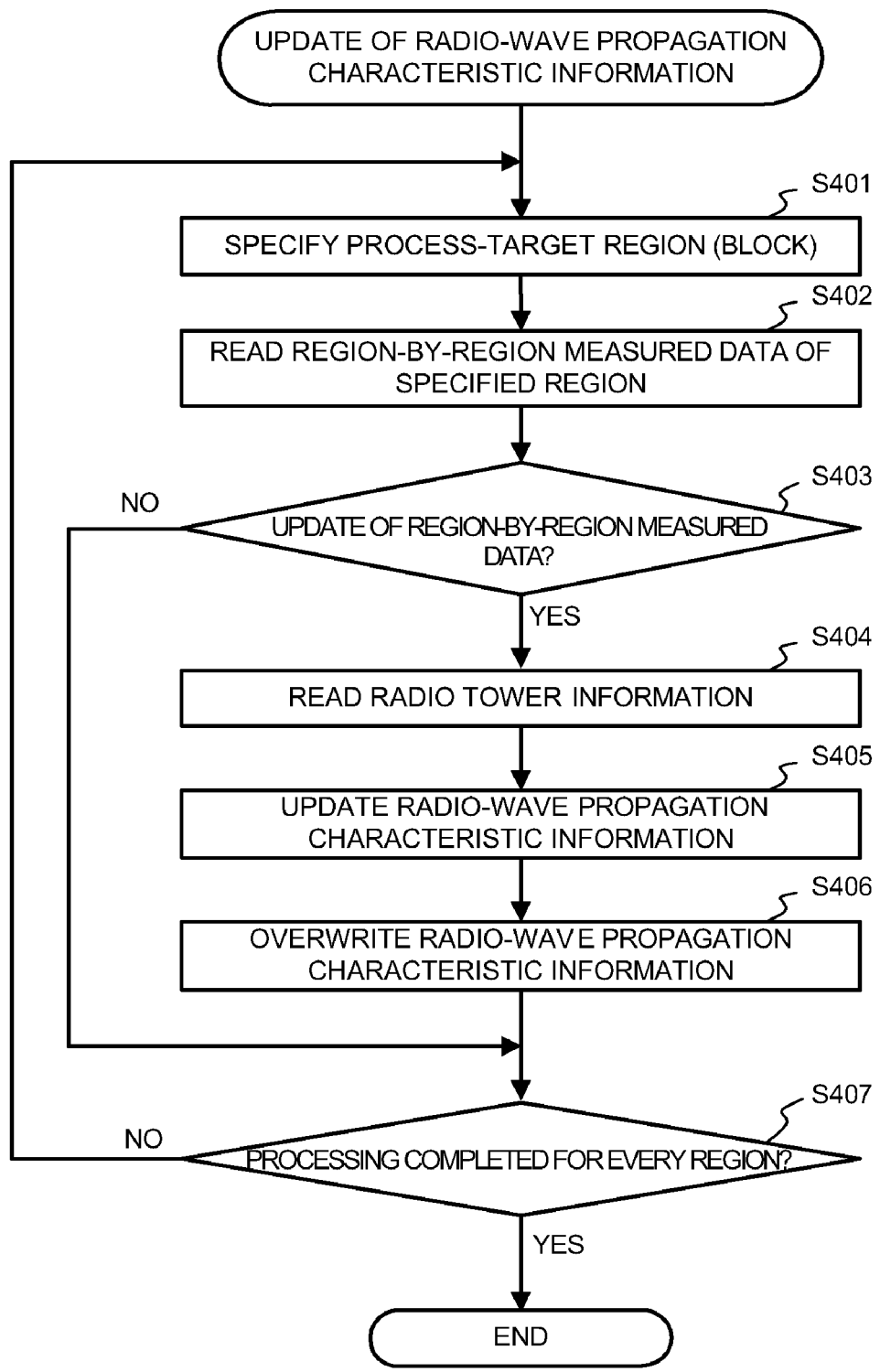
FIG. 12 is a flowchart illustrating procedures of a process of updating radio-wave propagation characteristic information.

When terminating the process illustrated in FIG. 11, or periodically or aperiodically, the control section 203 updates radio-wave propagation characteristic information stored in the reference information storage section 212. This process is described referring to FIG. 12.

First, the control section 203 specifies one region (block shown in FIG. 7A) to be a process target (step S401). Next, the control section 203 extracts region-by-region measured data which has the region specified as the process target as a measuring point (step S402). The control section 203 determines whether or not the extracted region-by-region measured data has changed since the previous process (step S403). When the region-by-region measured data has not changed (step S403; NO), the control section 203 goes to step S407.

When the region-by-region measured data has changed since the previous process (when region-by-region measured data is added: step S403; YES), the control section 203 reads radio tower information of a radio tower in the specified region or a nearby region from the region information storage section 211 to update the radio-wave propagation characteristic information of the specified region (step S404).

Next, assuming that radio waves with the energy specified by the radio tower information are radiated from the position specified by the radio tower information, the control section 203 acquires a logic model (formula) to acquire a logical value which provides small errors with respect to the radio intensity, propagation loss and transmission rate measured at each measuring point in the region (step S405). Provided that n measuring points are present in one region and that the radio intensity, propagation loss and transmission rate measured at the i-th measuring point are (ui, vi, wi), respectively, a logic model (formula) F to minimize the overall errors between the measured values and a group of measured values (ul, vl, wl) to (un, vn, wn) is acquired (step S405). The control section 203 may select a logic model (formula) which provides the best matching between information (radiation position, height of the radio tower, radiation energy, directivity, etc.) of the radiated radio waves specified by the radio tower information and a plurality of actually measured values from a plurality of (m in this example) logic models (formulas) F1, . . . , Fm prepared in advance, and may specify individual coefficients included in the logic model (formula). For example, the control section 203 acquires individual coefficients in the propagation loss calculation formula using a regression method.

Specifically, the control section 203 uses the propagation loss calculation formula which is expressed by the linear sum of the parameters, such as the distance from the radiation position, the height of the radio tower, and the frequency, disclosed in Non-patent Document 1 (Koshiro Kitao, Shinichi Ichitubo, "Urban District Propagation Loss Prediction System For Fourth Generation Mobile Communication System", Material for 485th URSI Commission F Japanese Committee, Jun. 18, 2004). The control section 203 acquires the individual coefficients of the parameters in the propagation loss calculation formula in such a way as to minimize errors between the logic values calculated from the propagation loss calculation formula and the actually measured values.

The control section 203 stores the acquired propagation loss calculation formula as radio-wave propagation characteristic information in the reference information storage section 212 (step S406).

Then, the control section 203 determines whether or not processing for all the regions is finished (step S407). When the processing is not finished, i.e., when an unprocessed region (block) remains (step S407; NO), the control section 203 specifies a next process-target region in step S401, and executes a similar sequence of processes thereafter.

Finally, when the processing for every region is finished (step S407; YES), the process is terminated.

In this manner, for each region (block), information on a model which best represents the radio-wave propagation characteristic of the block is stored in the reference information storage section 212 as shown in FIG. 8.

Next, referring to FIGS. 13A and 13B, a description is given of the process in which a person who is planning to open a new communication business service retrieves radio-wave propagation characteristic information for a region similar to the region of interest from an area where the service has already been provided, to predict the radio-wave propagation characteristic of an arbitrary region in a planning area.

First, the user segments the area whose radio-wave propagation characteristic is to be predicted to blocks with a size of 1 km×1 km. Next, the user acquires an attribute of each block (population density, land use classification (building or not), distinction between a mountainous region and a plain).

Subsequently, the user operates the analysis terminal apparatus 30 to start a process illustrated in FIG. 13A, so that the control section 302 causes the I/F section 300 to display an inquiry screen (search key input screen) 400 as shown in FIG. 9. The control section 302 stands by for a user's input in this state (step S501). The user inputs known attributes of a region (block) whose radio-wave propagation characteristic is to be predicted on the inquiry screen 400, and presses a "Search" button 401 after finishing the input.

In response to the operation, the control section 302 of the analysis terminal apparatus 30 transmits a search request and the input attribute information to the data storage apparatus 20 via the data-storage-apparatus handling section 301 (step S511).

The control section 203 of the data storage apparatus 20 receives the transmitted search request and attribute information via the data-storage-apparatus handling section 301.

In response to the received search request, the control section 203 searches the reference information storage section 212 of the database 200 with the attribute accompanying the search request used as a key to retrieve a region whose attribute matches with the received attribute (step S601).

Next, the control section 203 determines whether or not there is a region whose attribute matches with (or has a certain similarity to) the received attribute (step S602). When a region whose attribute matches with the received attribute is retrieved (step S602; YES), the control section 203 reads radio-wave propagation characteristic information for the retrieved region from the reference information storage section 212 (step S603).

The control section 203 transmits response information including information on the retrieved one or more regions and the radio-wave propagation characteristic information for each region to the analysis terminal apparatus 30 (step S612). When the target region cannot be retrieved in step S602 (step S602; NO), the control section 203 transmits response information indicating the event to the analysis terminal apparatus 30 (step S611).

Upon reception of the response information from the data storage apparatus 20, the analysis terminal apparatus 30 checks the contents of the information to determine whether or not the retrieved region information is included therein (step S502).

When the response information includes the retrieved region information (step S502; YES), the control section 302 causes the I/F section 300 to display the region information and radio-wave propagation characteristic information included in the response information as shown in FIG. 14A (step S503). In the display example, when the user depresses a "Details" button, the control section 302 requests the data storage apparatus 20 for information on the selected "region", processes the received information and displays a detailed screen as exemplified in FIG. 14B. The detailed screen has the information laid out so that various conditions of an area of interest where the user is planning to start the service from now are easily compared with various conditions of the displayed area. Further, a link to external information is embedded as needed. Furthermore, information, such as the type of the service to be provided in the region, the service providing company, and the positions and powers of base stations, is also presented.

The user refers to the information on the retrieved region to study the radio-wave propagation characteristic of the target region of interest where a new service is planned to start; for example, the number of base stations, the locations of the base stations, the output powers of the base stations, etc. are studied.

When it is determined that the response information does not include the retrieved region information (step S502; NO), on the other hand, the control section 302 causes the I/F section 300 to display a message indicating the event (step S504).

Assuming that the user has designated the "low" population density, "middle" building ratio and "low" undulation on the screen in FIG. 9, and has pressed the "Search" button, for example, the control section 203 of the data storage apparatus 20 retrieves a region whose attribute is similar to the attribute of a region from region-by-region measured data in FIG. 6A. In the example of FIG. 6A, the attribute of the region in row R1 coincides with the input attribute.

Accordingly, the control section 203 reads coordinate information, region name information, attribute, information on each sub region, and so forth which are registered in the row R1. Further, the control section 203 reads the radio-wave propagation characteristic information of the same region from a row R2 in the reference information storage section 212 shown in FIG. 8. The control section 203 transmits response information including those pieces of information to the analysis terminal apparatus 30.

As described above, the radio-wave propagation characteristic prediction assisting system 1 according to the embodiment can allow a user to retrieve a region which has the same attribute as the attribute of an arbitrary region (target region) where the user is planning to provide a radio communication service from now from the area where the radio communication service is already provided. The user can easily specify a reference region at the time of predicting the radio-wave propagation characteristic or the like for the target region.

The radio-wave propagation characteristic prediction assisting system 1 can also be adapted to prediction of the radio-wave propagation characteristic or the like in a network other than a cell phone network, such as a PHS network or wireless LAN, for the target region.

In addition, the radio-wave propagation characteristic prediction assisting system 1 presents the user with radio-wave propagation characteristic information for a retrieved region. The user can refer to the presented radio-wave propagation characteristic information or the like at the time of predicting the radio-wave propagation characteristic for the target region, facilitating the prediction. It is therefore possible to design an optimal radio communication system in the target region.

Further, the radio-wave propagation characteristic prediction assisting system 1 can automatically update the radio-wave propagation characteristic information stored in the data storage apparatus 20 every time the measuring terminal apparatus 10 acquires new measured data. Therefore, the radio-wave propagation characteristic information stored in the data storage apparatus 20 can be maintained to latest and optimal information.

The present invention is not limited to the foregoing embodiment, and can be subject to various modifications and applications. Although a region is a block of "1 km×1 km" in the foregoing description, for example, the size and shape are optional, and a rectangular block with an arbitrary size may be set. Further, each region is given a region name, which may not be added.

While "population density", "building ratio" and "land undulation" are adopted as the attributes of each region, other attributes may be used. For example, the average height of buildings in a region may be adopted.

Although any of the three levels, "low", "middle" and "high", is set for each attribute, the number of levels is optional. For example, it is possible to set two levels of "low" and "high", set five levels of "very low", "low", "middle", "high", and "very high", or set numerals themselves.

Although the attributes, namely the land use classification and distinction between a mountainous region and a plain, are added to those regions (blocks) which are identified as having a low population density according to the embodiment, the attributes, the land use classification and distinction between a mountainous region and a plain, may be added to every region (block).

Further, the attribute on the land use classification may be added to those regions (blocks) which are identified as having a low population density, and the attributes on the distinction between a mountainous region and a plain may be added to every region (block).

Second Embodiment

Although the measuring terminal apparatus 10 automatically transmits measured data to the data storage apparatus 20 according to the embodiment, the timing and momentum at which the measuring terminal apparatus 10 transmits measured data to the data storage apparatus 20 are optional.

The following describes an embodiment according to which the measuring terminal apparatus 10 collects measured data, and then transmits the measured data to the data storage apparatus 20 in response to a user's instruction.

Figure 15A:
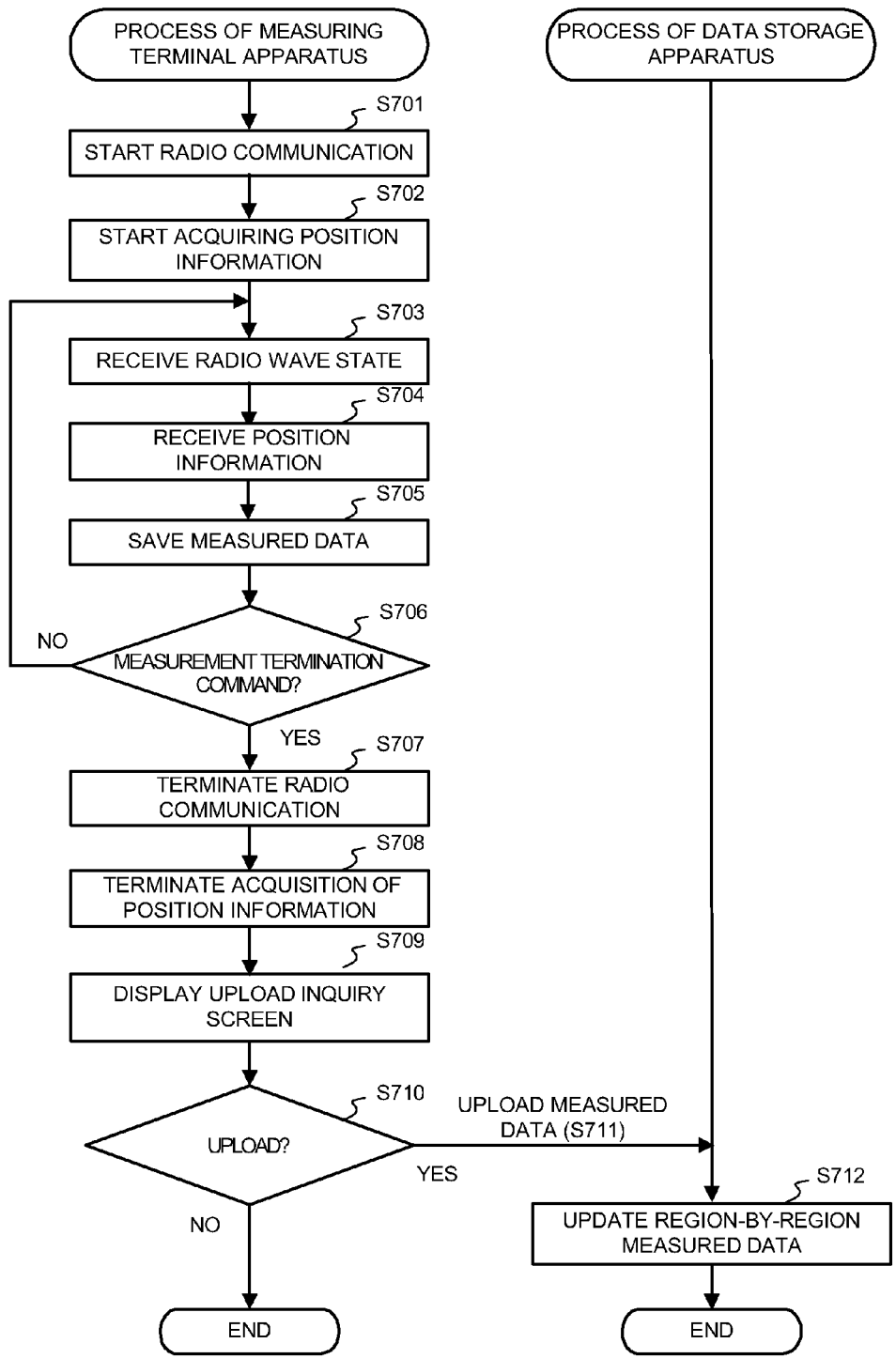
FIGS. 15A and 15B are flowcharts illustrating procedures from the initiation of measuring a radio wave state with a measuring terminal apparatus to a process of saving region-by-region measured data in a data storage apparatus according to a second embodiment.
Figure 15B:
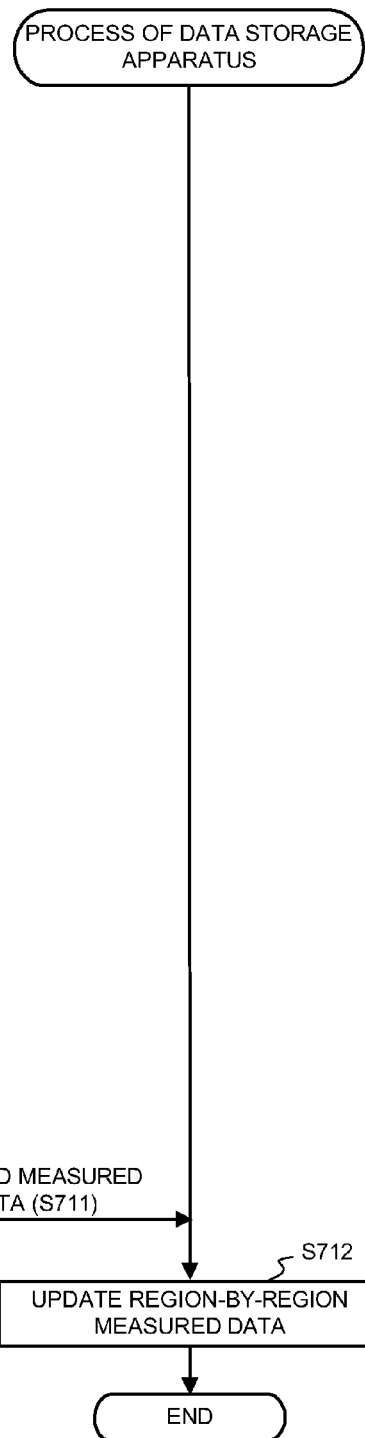

When the user activates the measuring program in the measuring terminal apparatus 10, the control section 104 starts a process illustrated in FIG. 15A. First, the control section 104 causes the radio communication section 100 to initiate radio communication (step S701), and causes the position information acquiring section 101 to start acquiring position information (step S702). Then, the control section 104 receives the radio wave state which is measured by the radio communication section 100 (step S703), and receives position information output from the position information acquiring section 101 (step S704).

The control section 104 joins the received radio wave state and position information to generate measured data, and saves the measured data in the data storage section 102 (step S705).

Subsequently, the control section 104 determines whether or not the user has input a command to terminate measurement (step S706). When there is no termination command (step S706; NO), the control section 104 repeats the process starting at step S703. When there is the termination command from the user (step S706; YES), the control section 104 terminates radio communication of the radio communication section 100 (step S707), and terminates acquisition of the current position of the position information acquiring section 101 (step S708).

Figure 16:
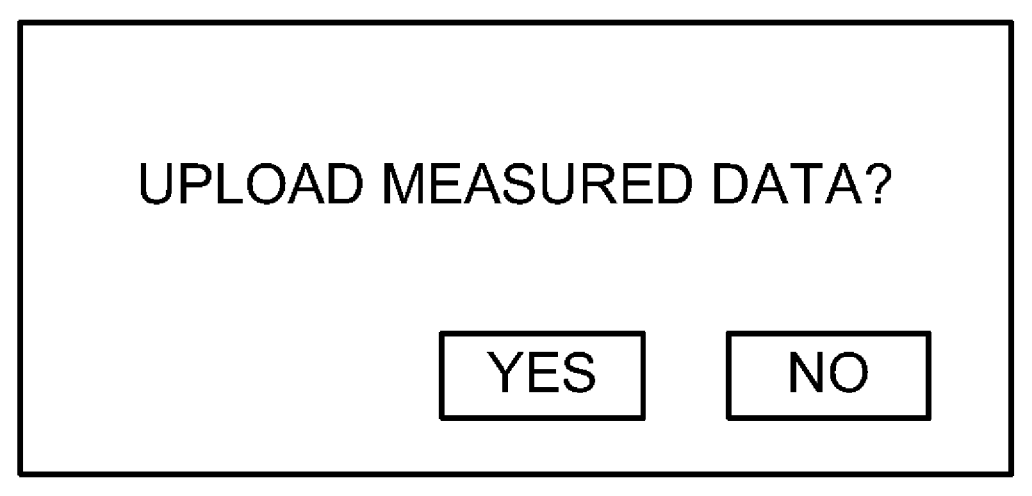

Then, the control section 104 displays a screen for inquiring whether or not to upload measured data (upload inquiry screen) as shown in FIG. 16 on the monitor or the like of the measuring terminal apparatus 10 (step S709). When the user selects "Yes" (step S710; YES), the control section 104 transmits the measured data saved in the data storage section 102 to the data storage apparatus 20 via the communication section 103 (step S711). When the user selects "No" (step S710; NO), on the other hand, the control section 104 terminates the process without executing upload.

The control section 203 of the data storage apparatus 20 receives the uploaded measured data from the measuring terminal apparatus 10. The control section 203 puts a label for a region to which the measuring point belongs to the measured data to thereby generate region-by-region measured data. Next, the control section 203 stores the generated region-by-region measured data in the measured data storage section 210 of the database 200 to update the region-by-region measured data (step S712).

As measured data is collectively transmitted to the data storage apparatus 20 in the above manner, the process load of the measuring terminal apparatus 10 is reduced, thus improving the communication efficiency.

The present invention is not limited to the second embodiment, and can be modified in various forms without departing from the spirit or scope of the invention.

Although the apparatus which collects measured data, the apparatus which generates a database where search is to be performed, and the search apparatus are treated as a single apparatus as a whole according to the foregoing embodiment, for example, those apparatuses may be treated as separate apparatuses. For example, the measuring terminal apparatus 10 may be treated as a single apparatus, the part in the data storage apparatus 20 which generates data to be searched may be treated as a single apparatus, and the apparatus which searches the generated search data may be treated as a stand-alone type apparatus.

Data transmission and reception or update of the contents of region-by-region measured data may be carried out through a medium, such as a DVD, without going through a network. In addition, data measured by a third party may be used as measured data.

The sequence of the individual processes in the flowcharts explained in the foregoing descriptions of the embodiments is not limited, and can be changed to an arbitrary sequence without departing from the spirit or scope of the invention.

In the radio-wave propagation characteristic prediction assisting systems according to the embodiments, as described above, measured data uploaded from the measuring terminal apparatus 10 is saved as region-by-region measured data, together with region information representing the characteristic of a region, by the data storage apparatus 20. The data storage apparatus 20 saves information for predicting a radio-wave propagation characteristic prepared from the region-by-region measured data for each region. Designating the attribute of a region, the user can acquire information for predicting the radio-wave propagation characteristic. According to the embodiments, the user can predict a radio-wave propagation characteristic for a region whose radio wave state has not been measured yet, at the time of considering the locations or the like of base stations.

The radio-wave propagation characteristic prediction assisting system 1 according to each of the embodiments acquires a radio-wave propagation characteristic (propagation loss calculation formula) for each region in advance, and presents the user with a radio-wave propagation characteristic associated with the retrieved region. The present invention is not limited to this mode. Information that the system 1 provides is optional as long as the user can easily specify a region similar to a region of interest and predict a radio-wave propagation characteristic for the region of interest referring to information on the similar region. For example, the radio-wave propagation characteristic prediction assisting system 1 may present map information of a retrieved region (which can be referred to, for example, check undulation of a land), land use information (which can be referred to, for example, check the building ratio), and measured data (raw data) as reference information instead of the radio-wave propagation characteristic information which has already been calculated.

What is claimed is:

1. A radio-wave propagation characteristic prediction assisting system comprising:

a storage section that stores attribute information of a region and reference information useful for predicting a radio-wave propagation characteristic of the region in association with each other;

an attribute information input section that inputs attribute information of a region whose radio-wave propagation characteristic is to be predicted; and an output section that searches information stored in the storage section to specify a region having an attribute which matches with the attribute information input by the attribute information input section, and outputs reference information associated with the specified region.

2. The radio-wave propagation characteristic prediction assisting system according to claim 1, wherein the reference information is an equation to compute a propagation loss of a signal.

3. The radio-wave propagation characteristic prediction assisting system according to claim 1, wherein the attribute information includes a population density.

4. The radio-wave propagation characteristic prediction assisting system according to claim 1, further comprising:

a radio wave state measuring section that measures a radio wave state;

a position information acquiring section that acquires a measuring position at which the radio wave state is to be measured; and a measured data storage section that classifies information on the radio wave state and information on the measuring position into a region to which the measuring position belongs, and stores both information.

5. The radio-wave propagation characteristic prediction assisting system according to claim 4, further comprising a reference information creating section that creates the reference information based on the information on the radio wave state and the information on the measuring position.

6. A radio-wave propagation characteristic prediction assisting method executed by a radio-wave propagation characteristic prediction assisting system comprising a storage section, an attribute information input section, and an output section, the method comprising:

a storage step, performed by the storage section, of storing attribute information of a region and reference information useful for predicting a radio-wave propagation characteristic in the region in association with each other;

an attribute information input step, performed by the attribute information input section, of inputting attribute information of a region whose radio-wave propagation characteristic is to be predicted; and an output step, performed by the output section, of searching information stored in the storage step to specify a region having an attribute which matches with the attribute information input in the attribute information input step, and outputting reference information associated with the specified region.

7. A radio-wave propagation characteristic prediction assisting device comprising:

storage means that stores attribute information of a region and reference information useful for predicting a radio-wave propagation characteristic in the region in association with each other;

attribute information input means that inputs attribute information of a region whose radio-wave propagation characteristic is to be predicted; and output means that searches information stored in the storage means to specify a region having an attribute which matches with the attribute information input by the attribute information input means, and outputs reference information associated with the specified region.

* * * * *